United States Patent
Baumgartner et al.

(10) Patent No.: US 7,064,659 B2
(45) Date of Patent: Jun. 20, 2006

(54) GLIDE TESTING OF DISKS WITH CALIBRATION CONFIRMATION TESTING BY INDUCING COLLISION OF THE SLIDER WITH PRODUCTION DISK SURFACE

(75) Inventors: Bradley Frederick Baumgartner, Los Banos, CA (US); Norman Chu, San Francisco, CA (US); Patricia Galindo, Morgan Hill, CA (US); Hang Fai Ngo, San Jose, CA (US); Yu Lo, Foster City, CA (US); Nalin Zhou, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 136 days.

(21) Appl. No.: 10/931,316

(22) Filed: Aug. 31, 2004

(65) Prior Publication Data
US 2006/0042073 A1 Mar. 2, 2006

(51) Int. Cl.
*G08B 29/00* (2006.01)
(52) U.S. Cl. .......................... 340/514; 360/25; 360/31; 324/212
(58) Field of Classification Search ................ 340/514; 324/202, 210, 212; 360/25, 31, 76, 77.01, 360/77.02
See application file for complete search history.

(56) References Cited

U.S. PATENT DOCUMENTS

| 4,777,544 | A | | 10/1988 | Brown et al. |
| 5,237,861 | A | | 8/1993 | Suda et al. |
| 5,410,439 | A | | 4/1995 | Egbert et al. |
| 5,537,034 | A | * | 7/1996 | Lewis ......................... 324/212 |
| 5,675,462 | A | | 10/1997 | Ayabe |
| 5,901,001 | A | | 5/1999 | Meyer et al. |
| 5,952,563 | A | | 9/1999 | Shiraki |
| 6,052,243 | A | * | 4/2000 | Shimada ....................... 360/46 |
| 6,094,973 | A | | 8/2000 | Novotny |
| 6,140,814 | A | * | 10/2000 | Sundaram ................... 324/212 |
| 6,142,006 | A | | 11/2000 | Marchon et al. |
| 6,275,029 | B1 | * | 8/2001 | Schaff ........................ 324/212 |
| 6,293,135 | B1 | | 9/2001 | Marchon et al. |
| 6,384,995 | B1 | * | 5/2002 | Smith .......................... 360/31 |
| 6,408,677 | B1 | | 6/2002 | Suzuki |
| 6,494,085 | B1 | | 12/2002 | Wakefield et al. |
| 6,567,229 | B1 | * | 5/2003 | Mallary et al. ............... 360/75 |
| 6,568,252 | B1 | | 5/2003 | Boutaghou |
| 6,943,969 | B1 | * | 9/2005 | Yokohata ..................... 360/25 |

FOREIGN PATENT DOCUMENTS

| JP | 7006365 A1 | 1/1995 |
| JP | 8045216 A1 | 2/1996 |
| JP | 8114431 A1 | 7/1996 |

* cited by examiner

Primary Examiner—John Tweel, Jr.
(74) Attorney, Agent, or Firm—G. Marlin Knight

(57) ABSTRACT

A method is presented for glide testing a disk which tests the glide head fly-height by inducing a collision between the glide head and a disk under test. The glide test system is initially calibrated using calibration disks. The method of the invention periodically tests the calibration without interrupting the production testing by lowering the rotation rate until the glide head collides with the rotating disk surface. The rotation rate at which the collision occurs is then compared with the value expected based on knowledge of disk samples and the initial calibration. Parameters for acceptable high and low values are established to detect changes in the glide test system performance to trigger automatic or manual recalibration.

7 Claims, 5 Drawing Sheets

GLIDE TESTING OF DISKS WITH CALIBRATION CONFIRMATION TESTING BY INDUCING COLLISION OF THE SLIDER WITH PRODUCTION DISK SURFACE

RELATED APPLICATION

A commonly assigned, co-pending application bearing Ser. No. 10/857,195 describes the use of a take-off height calibration disk which is used in the preferred embodiment of the invention described herein.

1. Field of the Invention

The invention relates to methods for testing disks used in magnetic storage devices, and more particularly to methods for calibrating and testing glide testers used to determine fitness of a disk surface for use with a flying slider.

2. Background of the Invention

In a typical prior art glide test system 10 as illustrated in FIG. 1 glide head 13 is urged toward the rotating magnetic disk 16 by a suspension (not shown). As the disk rotates an air-bearing develops under the glide head and causes it to fly to simulate the slider (not shown) which will ultimately be used with the disk. The distance between the glide head and the disk surface is called the "fly-height" whether the average value is meant or the "clearance" when the minimum distance is meant. The disk 16 typically includes a thin film overcoat 17 and a set of thin films 18 which include one or more ferromagnetic layers in which information is recorded. The disk 16 typically has the thin films on both sides of the disk. When the disks are installed in a disk drive a slider (not shown) is flown over the disk at very low fly-height. Fly-heights of less than 7 nm are needed. Accordingly, the surface of the disk must be extremely smooth and no protrusions above, for example, 4 nm to provide adequate clearance for the slider.

FIG. 2 illustrates selected components in a prior art glide test system 10. The glide tester control system 21 includes inputs and outputs to control the overall function of the system under software control. The glide tester control system 21 can be a computer equipped with digital and/or analog input and output hardware. The disk 16 is rotated by spindle motor 25 which is controlled by the glide tester control system 21. The rotation rate spindle motor is variable. The glide head 13 is selectably positioned over the disk 16 using an actuator 24. The glide test involves flying the glide head over the usable surface of the disk to determine its suitability for use in a disk drive. Protrusions or asperities in the disk surface collide with the glide head inducing vibration which is detected by sensor 14 which is typically a piezoelectric sensor.

U.S. Pat. No. 6,568,252 to Boutaghou issued May 27, 2003 discloses a method for testing the smoothness of a disc surface. A glide test is performed by first lowering the glide head until contact between the glide head and the disc surface occurs. The point of contact establishes a base line indicating the location of the disc surface. Once a base line is established, the glide head can be controlled so that it flies at the desired glide height above the disc surface. By first establishing the base line, the glide head can be flown with greatly increased precision at the desired glide height based on known relationships between glide height and various parameters, including spindle speed, various electrical parameters, or crown shape.

SUMMARY OF THE INVENTION

A method is presented for glide testing a disk which tests the glide head fly-height by inducing a collision between the glide head and a disk under test. The glide test system is initially calibrated using one or more calibration disks. The method of the invention periodically tests to confirm the calibration without interrupting the production testing by measuring the clearance rotation rate for the disk under test by lowering the rotation rate until the glide head collides with the rotating disk surface. The collision is typically nondestructive since the duration is very short and is preferably performed on an unused track on the disk surface. The rotation rate at which significant collisions occur is then compared with the range of values expected based on knowledge of disk samples and the initial calibration. The calibration confirmation test is used to detect changes in the glide test system that require recalibration. If the rotation rate is lower than expected, the glide head is flying higher than at the initial calibration point. If the rotation rate is higher than expected, the glide head is flying lower than at the initial calibration point. Parameters for acceptable high and low values are established by measuring the mean maximum asperities for a sample set of disks produced by the manufacturing process. Values outside the range trigger automatic or manual recalibration.

DETAILED DESCRIPTION OF THE INVENTION AND THE PREFERRED EMBODIMENTS

Figure 1:
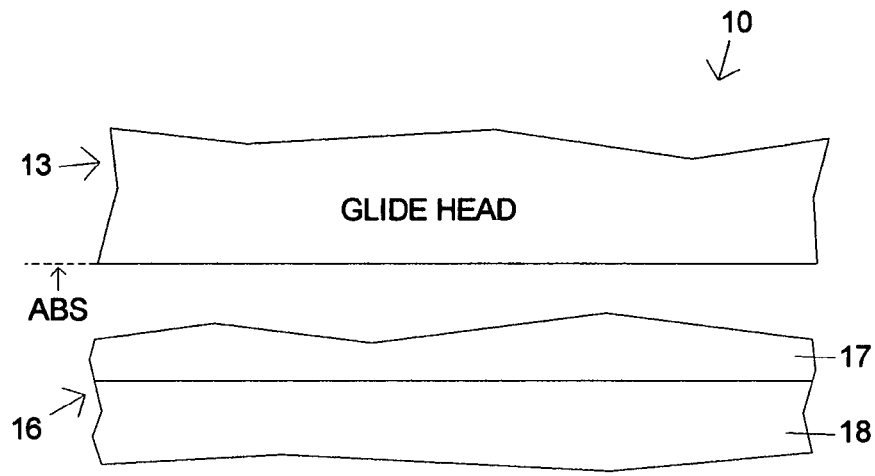
FIG. 1 is an illustration of selected components of a prior art glide test system illustrating the relationship between the glide head and the disk.
Figure 2:
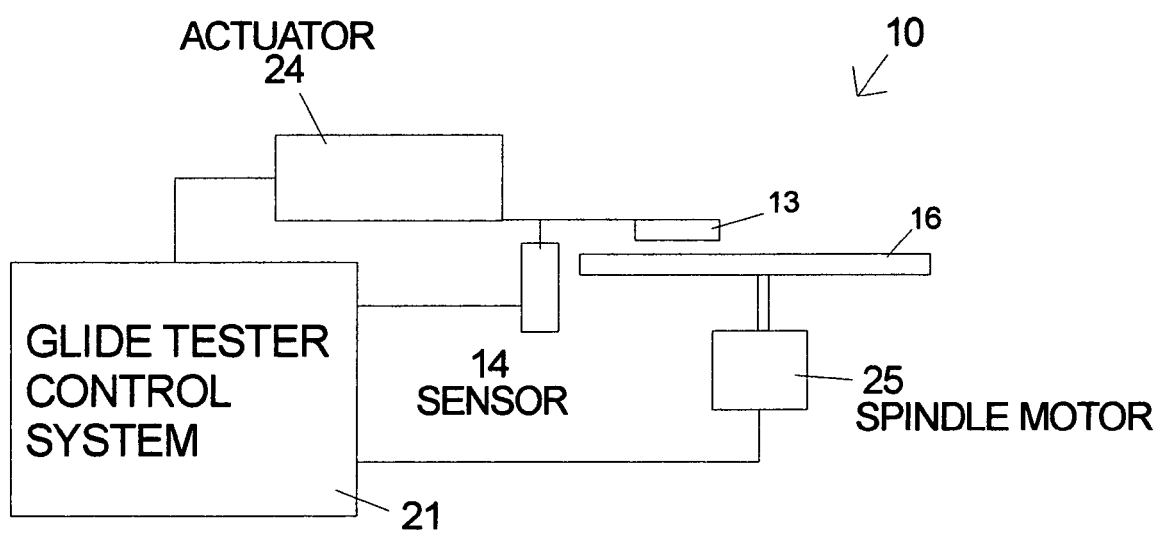
FIG. 2 is an illustration of selected components of a prior art glide test system.

The method of the invention is useful for testing the calibration of glide testers used for large scale manufacturing of disks for use in disk drives. FIG. 2 illustrates a prior art glide test system which can be used to implement the invention as described below. The glide test system 10 must be periodically calibrated to determine the rotation rate required for the glide head to fly at the target height over a calibration disk. One method of calibration uses a disk with a pattern of bumps of a known average height. The rotation rate (rpm) required for the glide head to just clear the bumps is determined by first flying the glide head at a height where no collisions occur, then slowing the rotation of the disk to lower the fly-height until collisions are detected. Since the average height of the bumps is known, the rotation rate for a fly-height corresponding to the average height of the bumps is then known. Preferably the average height of the bumps is selected to be the target fly-height. An additional data-point is needed to establish the relationship between the fly-height and the rotation rate. The additional data-point is preferably obtained at a lower fly-height, but it is presently very difficult to fabricate bumps less than the 7–8 nm range which are needed, so a production disk which is known to have a random surface with asperities that do not exceed the desired value is used. This type of disk will be called a take-off height calibration disk. The rotation rate required for head clearance for the take-off height calibration disk is determined by an empirical method which will also be used for the calibration confirmation testing and will be further described below.

The necessary modifications to implement the invention can be accomplished by modifying the programs (software or firmware) in glide test control system 21. The programs are modified to include confirmation of the calibration during the testing of some or all of the production disks being tested. The disk to be tested is loaded into the tester by automatic or manual means. The calibration confirmation testing can be performed before, after or during the glide test.

Figure 3:
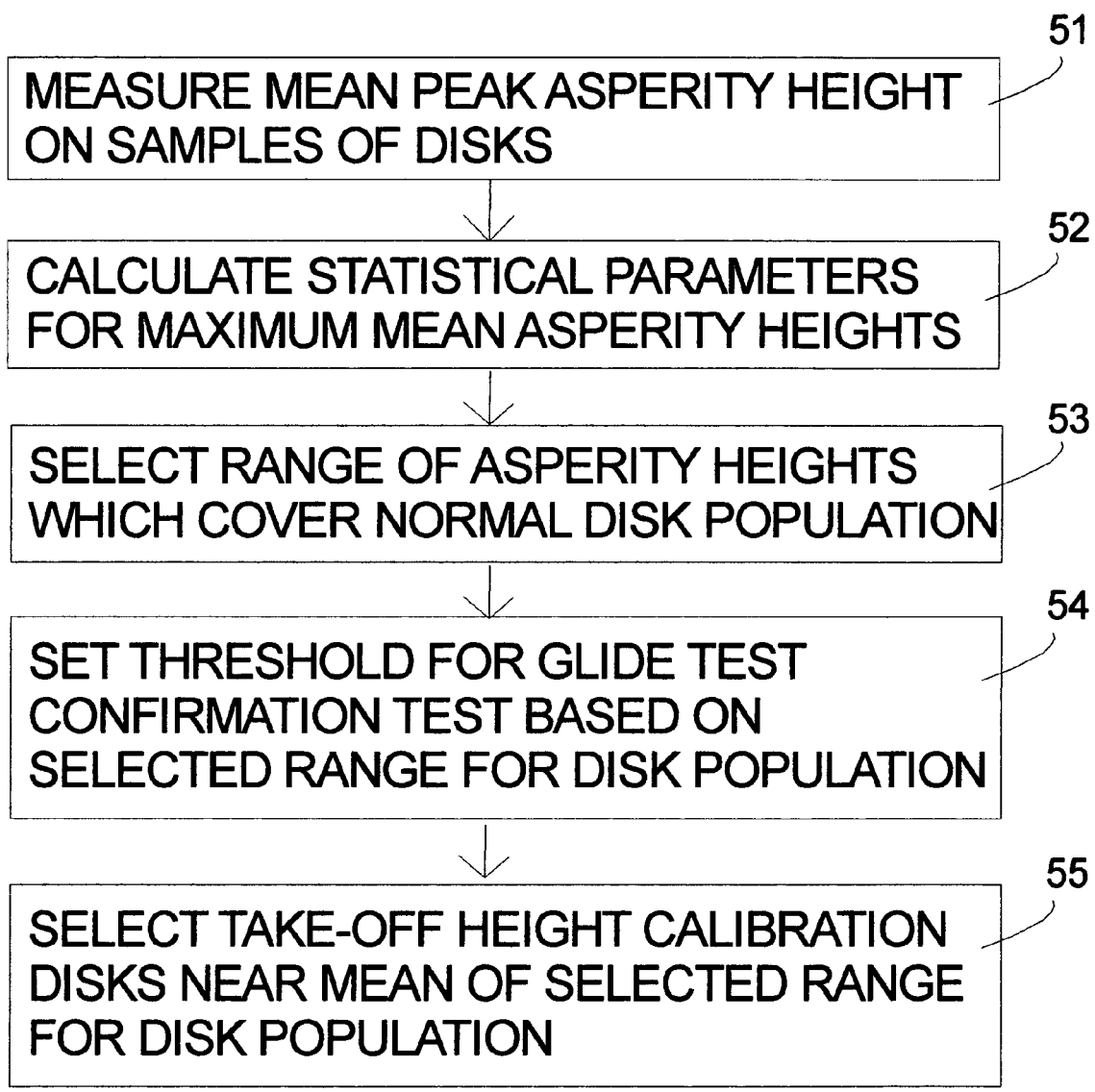
FIG. 3 is a flowchart of selected steps in an embodiment of the method of the invention illustrating the testing of a sample population of disks to determine the statistical distribution of maximum mean asperity heights.

FIG. 3 is a flow chart of the initial steps in a method according to the invention. The invention utilizes knowledge gained by measuring the mean peak asperity height of a sufficiently large sample of disks of the type which will be glide tested 51. The measurement can be made using a variety of instruments and prior art techniques. The absolute value of this measurement or the accuracy is not critical, since it will be used as a starting point in establishing the process and can be subsequently adjusted based on actual glide testing results. The statistical parameters of the data set are calculated 52, so that a value or range of asperity height values can be selected which covers most of the population 53. For example, the sample data might reveal that 99% of the disks have maximum mean asperity heights less than 4 nm and greater than 3 nm. This knowledge is then used to set an initial threshold or range of rotation rates to build into the glide test program for confirmation testing according to the invention 54. Since the calibration confirmation test is used to detect changes in the glide test system that require recalibration, the actual values of the mean asperity heights are not critical. The knowledge of the mean of the population sample is then used to select the take-off height calibration disks. A set of disks to be used with the glide test system is selected which have mean peak asperity heights near the population mean 55.

Figure 4:
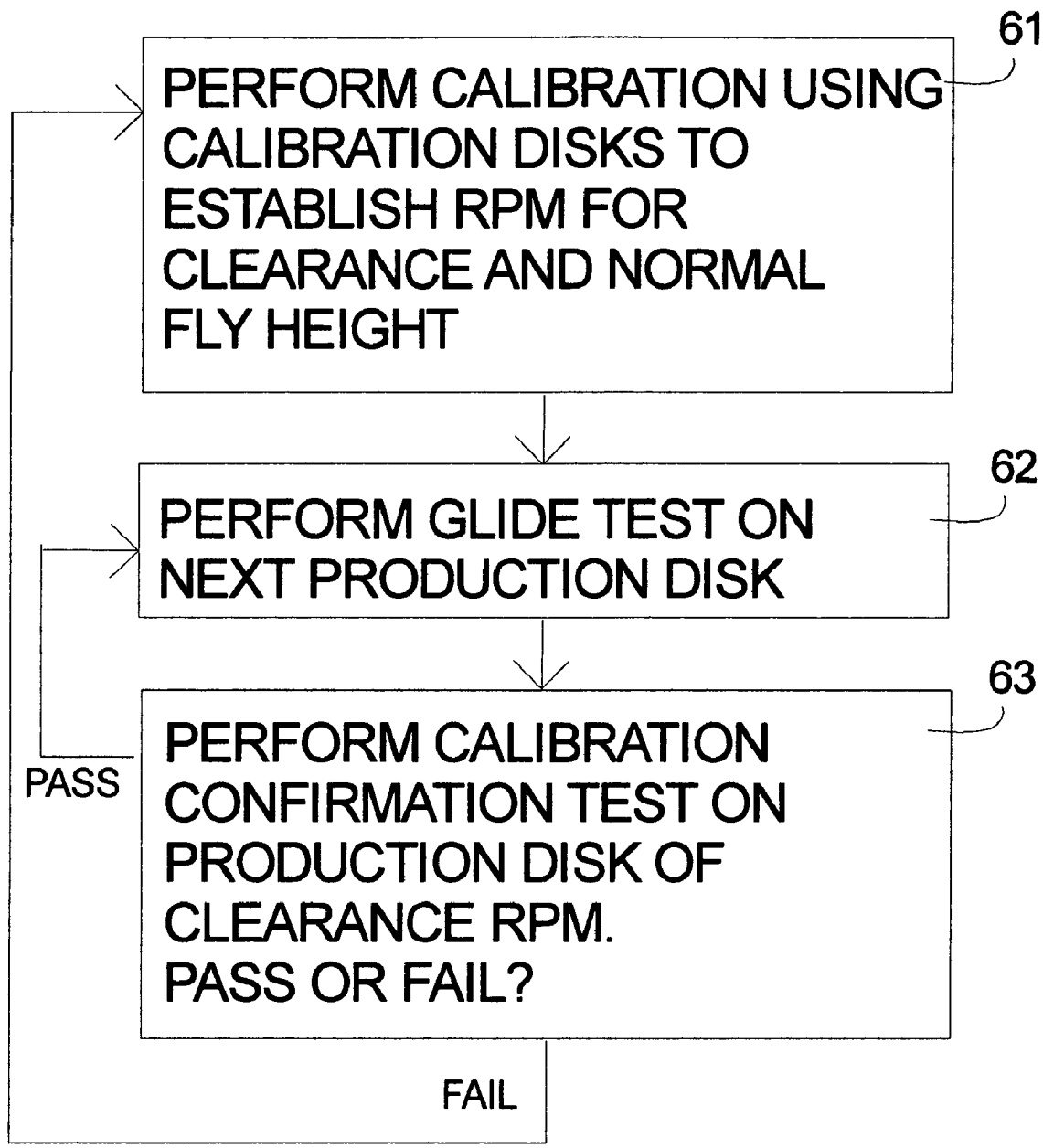
FIG. 4 is a flowchart of selected steps in an embodiment of the method of the invention illustrating the overview of the method of glide testing disks.

FIG. 4 is a flowchart of a preferred method according to the invention executed by the glide test system with calibration confirmation on selected disks. The glide test system is initially calibrated using calibration disks as in the prior art 61. The initial calibration determines the rotation rate required for the glide head to fly at the target height over a calibration disk with a pattern of manufactured bumps of a known average height. The rotation rate (rpm) required for the glide head to just clear the bumps is determined by first flying the glide head at a height where no collisions occur, then slowing the rotation of the disk to lower the fly-height until collisions are detected. Since the average height of the bumps is known, the rotation rate for a fly-height corresponding to the average height of the bumps is then known. Preferably the average height of the bumps is selected to be the target fly-height, for example, 7–8 nm. This first rotation rate is the one which will be used for a normal glide test. A second data-point is preferably obtained at a lower fly-height by using a disk prepared by the manufacturing process which is known to have a random surface with maximum mean asperities that do not exceed the desired value and are near the mean for the disk population, for example, 3–4 nm. The second rotation rate corresponds to the take-off height and is the rate needed to just clear most of the asperities on the selected disk is determined. There is a degree of flexibility in determining the rotation rate which is used as the clearance or take-off height rotation rate. When the head is at the take-off height some collisions with asperities still occur, so an empirical definition is used which can be consistently applied. The absolute value of the take-off height is not critical, since it is only necessary to detect changes over time in the performance of the glide test system. One example of an empirical definition is to define the clearance height to be the height at which the head encounters no asperities in 50% of the sectors in one or more selected tracks. The second rotation rate (the clearance RPM from calibration) and the range of RPM's from FIG. 3 are then used to setup the calibration confirmation test according to the invention. Typically, the allowable range of RPM's is centered around the second rotation rate, establishing upper and lower limits. The calibration confirmation test values are then compared to these limits for either pass (within limits) for fail (outside limits). The production glide test on the manufactured disks is conducted as in the prior art 62. Disks can pass or fail this test, but this part of the process is not shown in the flowchart. For a selected number of disks, for example, from 4 to 100%, the calibration confirmation test according to the invention is performed 63. If the calibration confirmation test succeeds, the glide test system proceeds to the next disk. If the calibration confirmation test fails, the glide test system invokes the calibration process using the calibration disks as described above. The process can be completely automated or operator intervention can be invoked by screen messages, alarms, etc.

Figure 5:
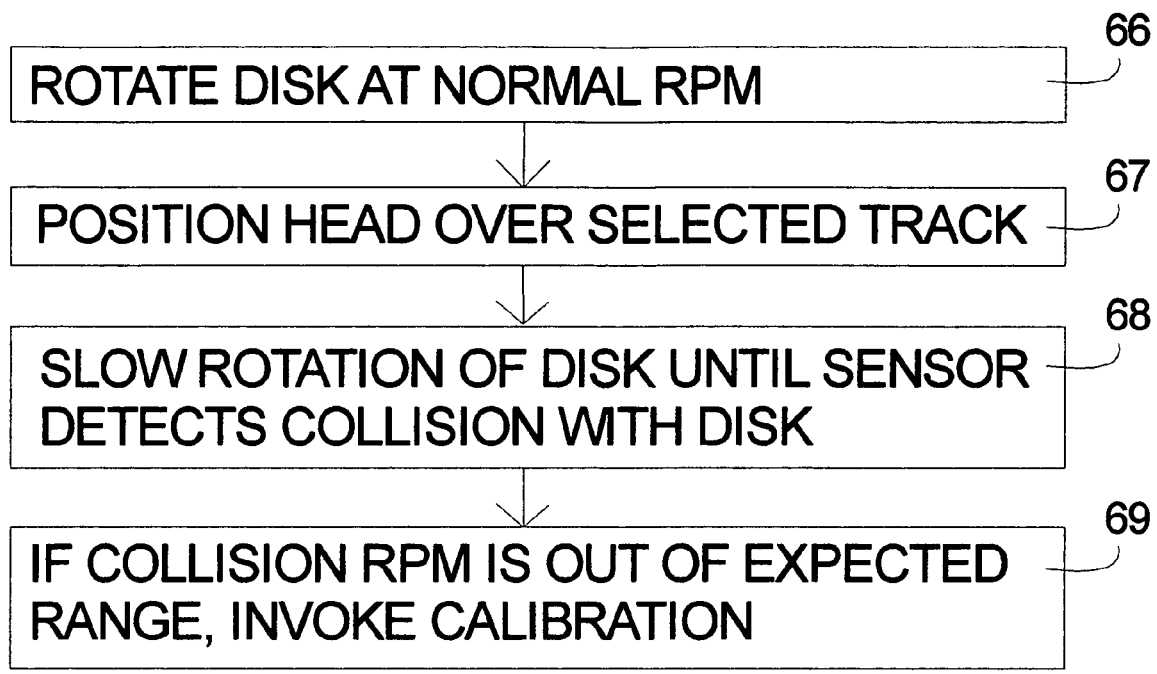
FIG. 5 is a flowchart of selected steps in an embodiment of the method of the invention illustrating the details of the method of confirming the calibration on selected manufactured disks.

FIG. 5 is a flowchart of the method steps according to the invention executed by the glide test system for selected disks to confirm the calibration. The disk is initially rotating at the normal rpm rate for glide test 66. The glide head is moved to a selected track which is preferably an unused track at the inner of outer extreme of the disk 67. The rotation rate of the disk is then gradually slowed until significant collisions with the disk surface are detected using the sensors connected to the glide head 68. The rotation rate at which the collisions were detected is compared with the acceptable range established during the testing described above. If the rotation rate is either too high or too low in comparison to the rotation rate required for clearance on the take-off height calibration disk during the last calibration, the confirmation fails and the calibration process is invoked 69. The calibration confirmation testing according to the invention should be tuned to detect changes in performance of the glide test system. The triggering values for recalibration should be set so that normal variations in the disks under test do not invoke recalibration. A glide test system operated according to the invention should be tuned to invoke recalibration with sufficient sensitivity that to cover actual changes in the glide test system performance, but should not be excessively sensitive so as to create false positives.

Figure 6:
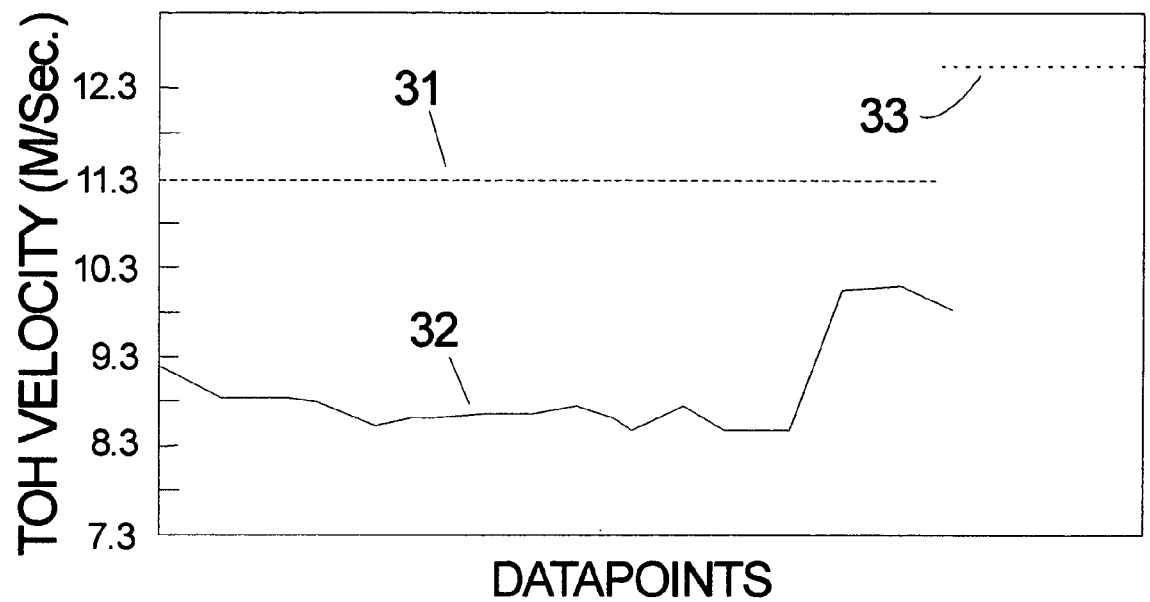
FIG. 6 is a graph illustrating the relationship between the rotation rate at take-off (TOH) and the calibration points of the glide test system according to the invention for a first test sequence.

FIG. 6 is a graph illustrating the relationship between the rotation rate at take-off (TOH) and the calibration points of the glide test system according to the invention for a first test sequence. The vertical scale is in meters/second. The data points along the horizontal axis are for manufactured disks. The dotted line 31 at 11.3 meters/second is the rotation rate established by the initial calibration of the glide test system using calibration disks as described above. The 11.3 meters/second is the value used for normal glide testing after the execution of the calibration process. The line 32 shows the clearance or take-off height (TOH) rotation rates determined by the confirmation testing according to the invention as described above. The rotation rate for clearance is under 9.3 meters/second for the first series of disks, but then goes above 9.8 meters/second for the last three disks. The calibration of the glide test system was performed again and resulted in a new value above 12.3 meters/second (line 33). The validity of the confirmation test according to the invention is confirmed by this result, since the test results accurately predicted that the original calibration rate was no longer valid.

Figure 7:
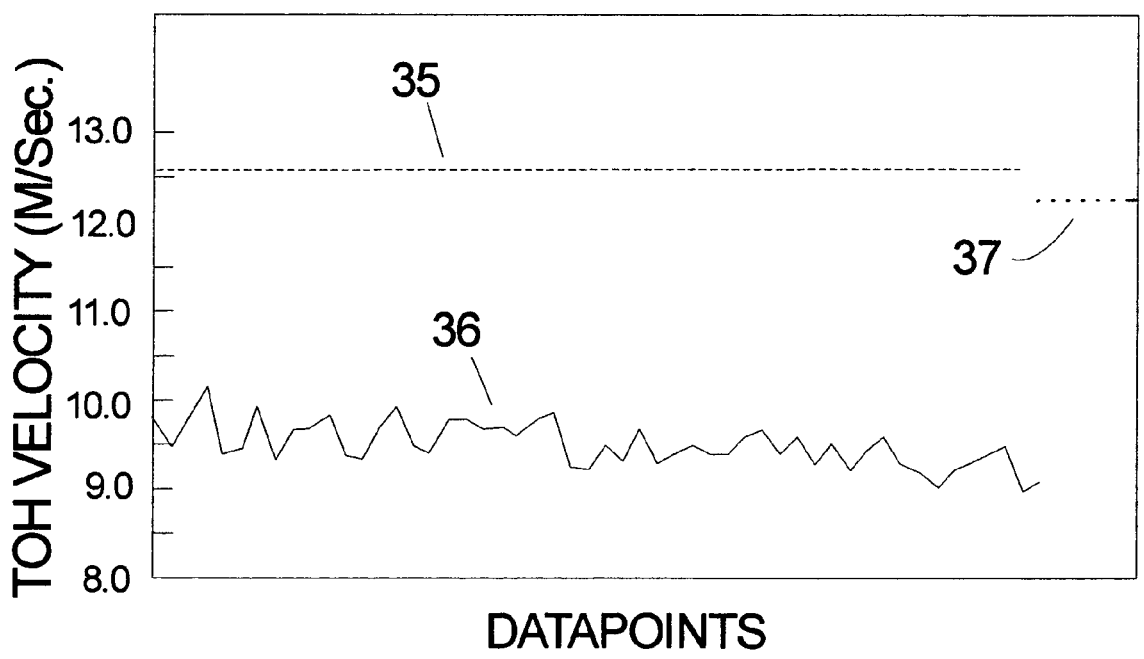
FIG. 7 is a graph illustrating the relationship between the rotation rate at take-off (TOH) and the calibration points of the glide test system according to the invention for a second test sequence.

FIG. 7 is a graph similar to FIG. 6 illustrating the relationship between the rotation rate at take-off (TOH) and the calibration points of the glide test system according to the invention for a second test sequence. The dotted line 35 at about 12.5 meters/second is the rotation rate established by the initial calibration of the glide test system using calibration disks as described above. The line 36 shows the clearance or take-off height (TOH) rotation rates determined by the confirmation testing according to the invention as described above. The rotation rate for clearance trended down as glide testing proceeded. The calibration of the glide test system was performed again and resulted in a new lower value (line 37). Again the validity of the confirmation test according to the invention is confirmed by this result, since the test results accurately predicted that the original calibration rate was no longer valid.

The method of the invention has been described with respect to particular embodiments, but other uses and applications for the measurement techniques according to the invention will be apparent to those skilled in the art.

The invention claimed is:

1. A method of manufacturing a disk for a disk drive comprising the steps of:
   calibrating a glide test system using one or more calibration disks to determine a first rotation rate for glide testing at which a glide head flies at a predetermined height and a second rotation rate for confirmation testing at which a glide head collides with asperities on a calibration disk; and
   glide testing disks produced by the fabrication process using the first rotation rate for glide testing and on selected disks performing a confirmation test to detect changes in performance of the glide test system including the steps of:
   moving the glide head to a predetermined track;
   determining a clearance rotation rate for the selected disk by reducing the rotation rate of the disk until collisions with asperities on the disk are detected; and
   repeating the calibration process when the clearance rotation rate for the selected disk is outside of a predetermined range.

2. The method of claim 1 wherein the predetermined track is an unused track.

3. The method of claim 1 wherein the step of calibrating a glide test system uses a calibration disk with a set of asperities of a maximum height equal to a target fly-height to determine the first rotation rate.

4. The method of claim 1 wherein the step of calibrating a glide test system uses a calibration disk produced by a fabrication process known to have asperities of a maximum mean height within a predetermined range of asperity heights.

5. A method of manufacturing a disk for a disk drive comprising the steps of:
   measuring a maximum mean asperity height on a set of disks produced by a fabrication process;
   selecting a range of maximum mean asperity heights covering a majority of the set of disks;
   selecting a production calibration disk with a maximum mean asperity height within the range of maximum mean asperity heights covering a majority of the set of disks;
   executing a calibration process for a glide test system using one or more calibration disks to determine a glide test rotation rate for glide testing at which a glide head flies at a predetermined height, and a clearance confirmation rotation rate range for confirmation testing at which the glide head collides with asperities on the selected production calibration disk; and
   glide testing disks produced by the fabrication process using the glide test rotation rate for glide testing and on selected disks performing a confirmation test to detect changes in performance of the glide test system including the steps of:
   moving the glide head to a predetermined track;
   determining a clearance rotation rate for the selected disk by reducing the rotation rate of the disk until collisions with asperities on the disk are detected; and
   repeating the calibration process when the clearance rotation rate for the selected disk is outside of the clearance confirmation rotation rate range.

6. The method of claim 5 wherein the predetermined track is an unused track.

7. The method of claim 5 wherein the step of calibrating a glide test system uses a calibration disk with a set of asperities of a maximum height equal to a target fly-height to determine the first rotation rate.

* * * * *